Feb. 7, 1928.
H. O. McGEE
1,658,645
SPRAY NOZZLE
Filed April 23, 1923
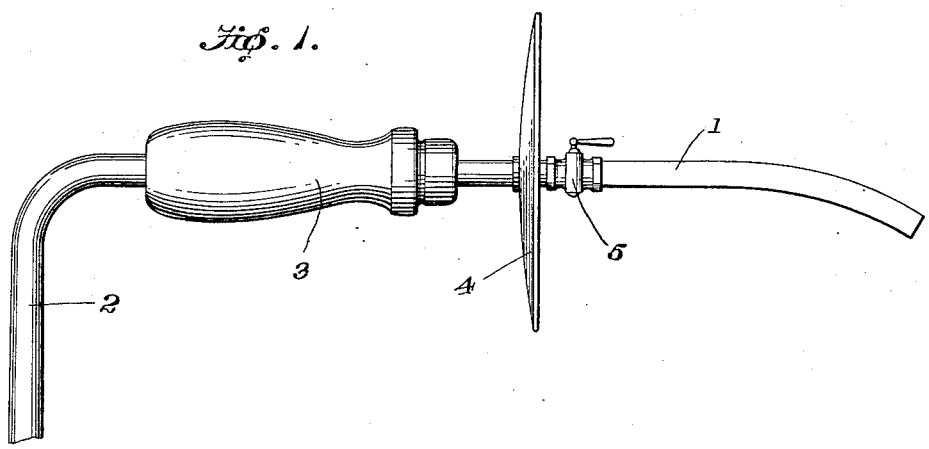
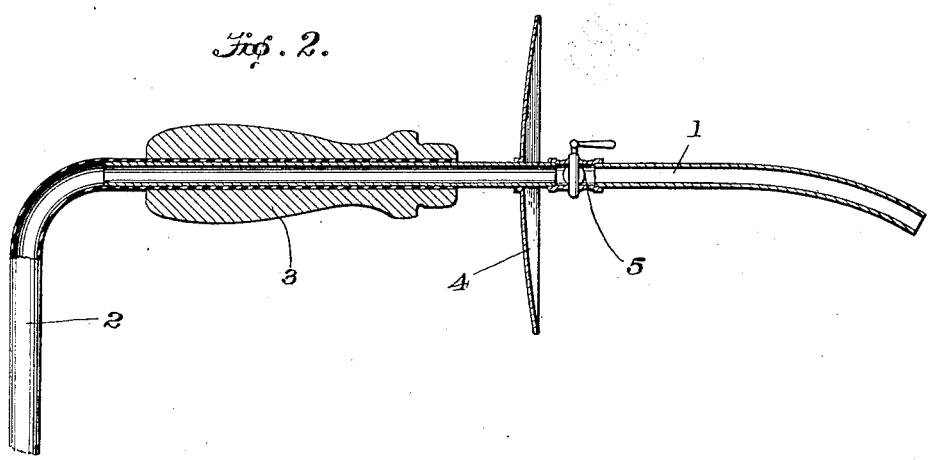

Patented Feb. 7, 1928.

1,658,645

UNITED STATES PATENT OFFICE.

HARRY O. McGEE, OF INDIANAPOLIS, INDIANA, ASSIGNOR TO LYKGLAS AUTO RENUAL SYSTEM, INC., OF INDIANAPOLIS, INDIANA, A CORPORATION OF INDIANA.

SPRAY NOZZLE.

Application filed April 23, 1923. Serial No. 634,052.

My invention relates to an improvement in spray nozzles.

This nozzle is particularly adapted for spraying hot liquids, such as water or the like, on painted surfaces to facilitate the removal of the paint. It consists of a piece of tubing having a valve therein, a hand-shield mounted on the tube for protecting the operator, and a handle secured to one end of the tubing.

In the accompanying drawings:

Fig. 1 is a view in side elevation; and

Fig. 2 is a longitudinal section.

The numeral 1 represents tubing, preferably of brass, with a rectangular outer end, in cross-section.

The opposite end of the tube is adapted to fit in the end of a rubber hose 2, and a handle 3 is secured to this end of the tubing over the end of the hose as a means for gripping and manipulating the spray nozzle. This handle 3 is provided with a bore therethrough of such a diameter that it securely holds the hose on the tube when it is telescoped over these members.

A valve or cock 5 is in position to be turned to control the spray or cut it off altogether.

A hand-shield 4 of suitable diameter is mounted on the tube between the valve or cock and the handle for the protection of the operator's hand while manipulating the nozzle and discharging the hot liquid therethrough.

This spray nozzle has been especially devised for discharging hot liquid and paintremover, especially with the idea of preventing the operator from being burned or scalded by spray discharged through the nozzle.

I claim:

1. The combination with a hose, of a tube inserted in the end thereof, a handle telescoped over the end of the hose, the tube and hose each passing entirely through the handle and held together thereby.

2. The combination with a hose, of a tube telescopically connected therewith, a handle telescoped over the end of the hose, the tube and hose each passing through the handle and held together thereby, said tube terminating in a rectangular outer end, a shield mounted on said tube between the outer end and the handle, and a valve for the tube.

In testimony whereof I affix my signature.

HARRY O. McGEE.